March 28, 1939.  H. VAN TONGEREN  2,152,114
DUST SEPARATOR
Original Filed Aug. 11, 1932  4 Sheets-Sheet 1
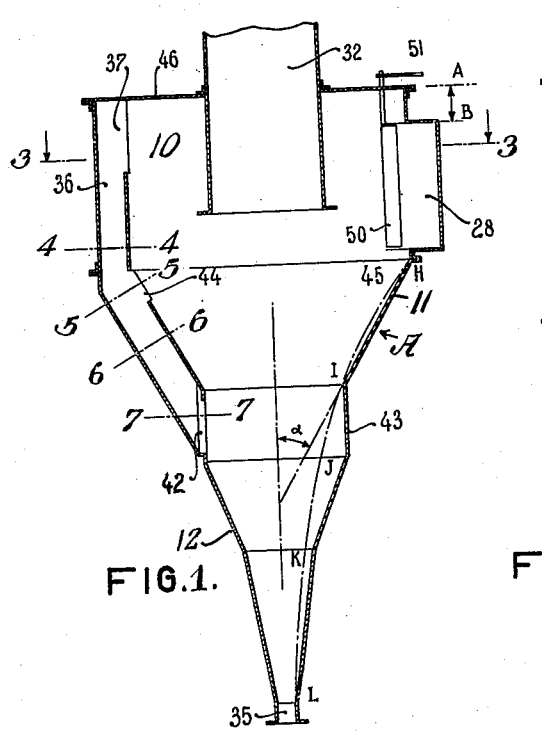
FIG.1.
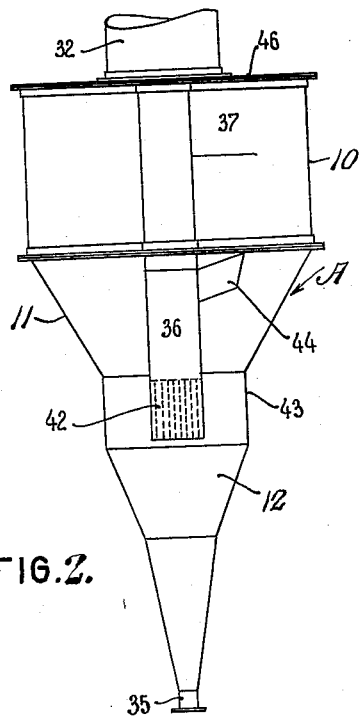
FIG.2.
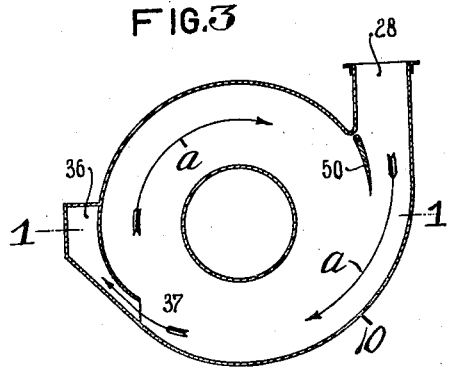
FIG.3
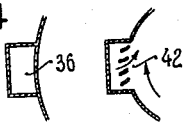
FIG.4.  FIG.7
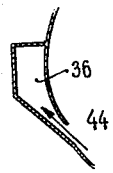
FIG.5.
FIG.6.
INVENTOR
HERMANNUS VAN TONGEREN

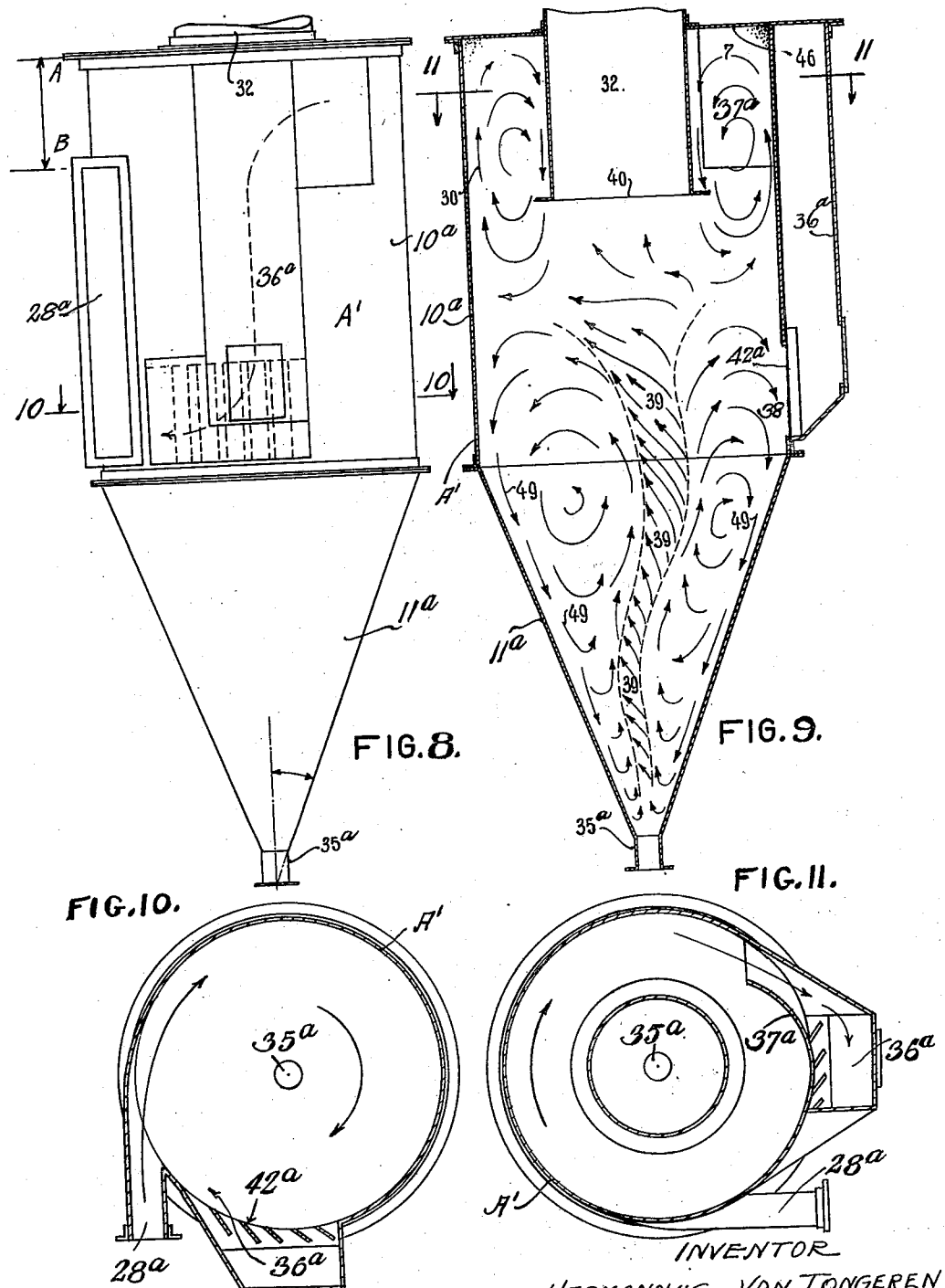

INVENTOR
HERMANNUS VAN TONGEREN

Patented Mar. 28, 1939

2,152,114

UNITED STATES PATENT OFFICE 2,152,114

DUST SEPARATOR

Hermannus van Tongeren, Heemstede, Netherlands

Original application August 11, 1932, Serial No. 628,408. Divided and this application April 2, 1936, Serial No. 72,400. In the Netherlands August 17, 1931

10 Claims. (Cl. 183—83)

This invention relates to apparatus for removing dust and other foreign matter from air, flue gases and the like, and has particular reference to apparatus for this purpose as disclosed in my prior application, Serial No. 628,408, filed August 11, 1932, now Patent No. 2,039,692, of which the present application is a division.

As explained in my aforesaid patent when a current of air or gas is required to follow a curved path, there is set up what is known as a "double eddy current"; that is, secondary air or gas currents flowing laterally outward from the middle of the main air or gas current.

Generally speaking, the object of the present invention is the same as set forth in my aforesaid prior patent; viz., to provide apparatus for utilizing the double eddy current set up by a current of air or gas traveling a curved path, to assist in removing dust and other foreign matter from the air or gas.

More particularly, the present application is directed to apparatus as illustrated and described in my aforesaid application, but not specifically illustrated, described nor claimed in my aforesaid patent, and in this connection a more specific object of the present invention is to provide, in dust removing apparatus of the cyclone type, novel and practical means for utilization of the double eddy current existent in such apparatus as a material aid in the rapid and efficient removal of dust and other foreign matter from air or gas passing through the apparatus.

With the foregoing and other objects in view, which will become more fully apparent as the nature of the invention is better understood, the same consists in dust removing apparatus embodying the novel features of construction, combination and arrangement of parts, as will be hereinafter more fully described, illustrated in the accompanying drawings and defined in the appended claims.

In the drawings:

Figure 1 is a vertical section through a dust removing apparatus of the cyclone type constructed in accordance with one practical embodiment of the invention, the section being taken on the line 1—1 of the cross sectional view, Figure 3.

Figure 2 is a side elevation of the apparatus shown in Figure 1.

Figure 3 is a cross section on the line 3—3 of Figure 1.

Figures 4, 5, 6 and 7 are detail cross sections on the lines 4—4, 5—5, 6—6 and 7—7, respectively, of Figure 1.

Figure 8 is a side elevation of a dust removing apparatus of the cyclone type constructed in accordance with an alternative embodiment of the invention.

Figure 9 is a vertical section through the apparatus shown in Figure 8.

Figure 10 is a cross section on the line 10—10 of Figure 8.

Figure 11 is a cross section on the line 11—11 of Figure 9.

Figure 12:
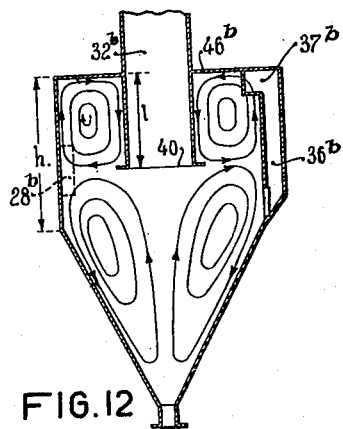
Figure 13:
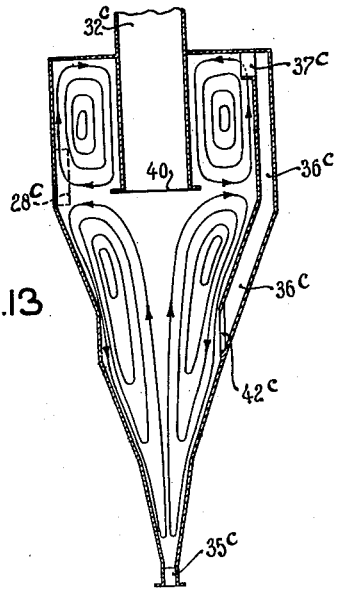

Figures 12 and 13 are views similar to Figure 1 illustrating other alternative embodiments of the invention.

Figure 14:
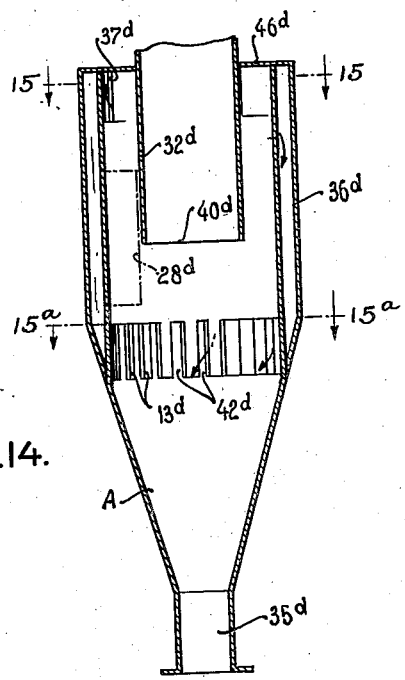

Figure 14 is a view similar to Figure 1 illustrating still another alternative embodiment of the invention.

Figure 15:
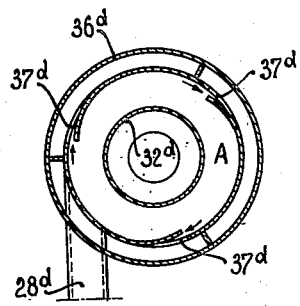

Figure 15 is a cross section on the line 15—15 of Figure 14.

Figure 15A:
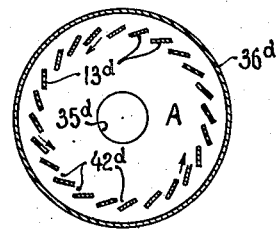

Figure 15a is a cross section on the line 15a—15a of Fig. 15.

Figure 16:
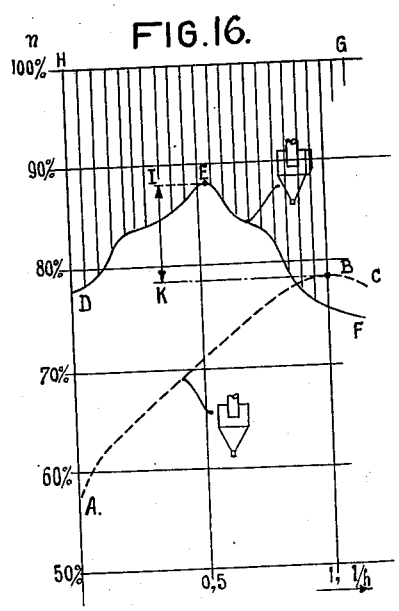
Figure 17:
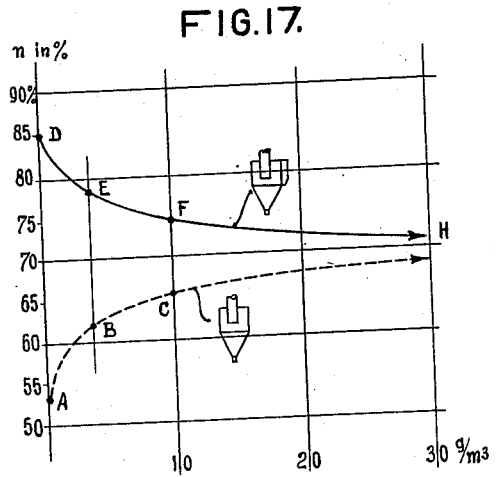

Figure 16 is a graph illustrating relative efficiencies of apparatus constructed in accordance with the invention (solid line) and apparatus constructed in accordance with prior practice (dotted line) with reference to different positions of the air or gas outlet of the apparatus; and Figure 17 is another graph illustrating relative efficiencies of apparatus constructed in accordance with the invention (solid line) and apparatus constructed in accordance with prior practice (dotted line) with reference to dust loading of the air or gas.

Referring to the drawings in detail, first with particular reference to the embodiment of the invention illustrated in Figures 1 to 7, it will be observed that the apparatus is of the cyclone type and includes a casing A the top portion 10 of which is of convolute form having vertical walls and is closed at its top by a top wall 46 having formed centrally therein an opening through which an air or gas outlet pipe 32 extends a suitable distance downwardly into the portion 10, preferably to a point below the middle of said portion.

From its top portion 10 the casing A tapers downwardly, as indicated at 11, to the top of a portion 43 which may be either of convolute or cylindrical form, and from the bottom of said portion 11 said casing again tapers downwardly, as indicated at 12, to its dust outlet, open lower end 35 of relatively small diameter.

Opening tangentially into the top portion 10 is an air or gas inlet conduit 28 of any suitable width and height which essentially has its top disposed below the top wall 46 of said casing portion 10 and above the lower, open end 40 of the outlet pipe 32, and which preferably is of such height that its lower end is disposed below the lower, open end, 40 of said outlet pipe 32 and near the bottom of said portion 10, the said lower, open end 40 of the outlet pipe 32 preferably being disposed approximately midway between the top and the bottom of said inlet conduit 28.

At a point approximately diametrically opposite the inlet conduit 28 the top portion 10 of the casing A is formed to provide a skimming opening 37 facing counter to the direction of flow of air or gas in a curved path, as indicated by the arrows a in Figure 3, from the inlet conduit 28 through the portion 10, and, as shown, the top of said skimming opening is disposed at the extreme top of said portion 10, said opening being of any suitable height and preferably of such height that its lower end is disposed in a plane only slightly below the plane of the top of the inlet conduit 28.

In preferably vertical alinement with the skimming opening 37 the casing portion 11 is formed to provide a second skimming opening 44 which faces in the same direction as the opening 37 and which may be of any suitable height, its top preferably being disposed at the top of said casing portion 11.

The skimming openings 37 and 44 open into a duct 36 which extends downwardly to a side opening 42 in the casing portion 43 where vanes 13, disposed as shown in Figure 7, preferably are provided to deflect the air or gas, travelling around the casing in the direction of the aforementioned arrows a, across said opening 42.

Where the inlet conduit 28 enters the casing there preferably is provided a vane 50 which is adjustable to vary the effective width of said inlet conduit.

Air or gas entering the portion 10 of the casing A through the inlet conduit 28 flows in a primary curved path following the curvature of the portion 10 as indicated by the arrows a and thereby sets up what is known as the aforementioned "double eddy current". In other words, the primary current divides medially into a pair of secondary currents one of which flows upwardly and outwardly and the other of which flows downwardly and outwardly. The primary air or gas current carries dust or other foreign matter suspended in the air or gas, toward the periphery of the casing, and the secondary air or gas currents carry the dust or other foreign matter upwardly and downwardly, respectively. The skimming openings 37 and 44 are located where the dust or other foreign matter would in the absence of said openings and due to the combined action of said primary and secondary currents, tend to concentrate at the upper outer corner of the casing portion 10 and at the junction of the casing portions 10 and 11. Consequently, there results a highly efficient and rapid removal of dust and other foreign matter from air or gas introduced into the present apparatus, the dust with some of the air or gas being carried downwardly through the duct 36 to the opening 42 and again into the casing A at a point in the lower portion of said casing where the air or gas, due to its cyclonic flow toward the outlet pipe 32, as illustrated by the arrows in Figure 9, sweeps the dust downwardly to the lower, open end of the casing for discharge through said end into any suitable receptacle. Any air or gas flowing downwardly through the duct 36 re-enters the casing A through the opening 42 and first travels downwardly with the outer fringe of the cyclonic flow and finally mixes with the upwardly traveling vortex of said flow, so that it again is subjected to cleaning when it enters the upper casing portion 10. However, instead of having the lower end of the duct 36 connected with the casing A, the said lower end of said duct may be connected directly with a dust receptacle.

By having the lower, open end of the outlet pipe 32 disposed in a plane approximately midway between the top and the bottom of the inlet conduit 28, that is, in the plane of division between the secondary air or gas currents, any direct flow of air or gas from the conduit 28 to the pipe 32 is avoided and, therefore, all of the air or gas entering the casing through the conduit 28 is subjected to cleaning by the skimming openings 37 and 44 before it eventually becomes part of the cyclonic flow toward and through said outlet pipe 32. Consequently, little, if any, dust or other foreign matter is contained in the air or gas passing outwardly through the pipe 32.

Figures 8 to 11 illustrate an alternative embodiment of the invention which essentially is the same in construction and mode of operation as the embodiment of the invention illustrated in Figures 1 to 7, except that the top portion 10$^a$ of the casing A' is more elongated vertically; the inlet conduit 28$^a$ is more elongated vertically; the bottom portion 11$^a$ of the casing is formed as a single, continuous cone, the lower skimming opening is eliminated, and the duct 36$^a$ is connected with the casing portion 10$^a$ in the plane of the lower, secondary air current. By this construction the top strata of the air or gas comprised by the upper, secondary air current is cleaned by the skimming opening 37$^a$ as in the case of the Figure 1 construction, while the lower, secondary air current by sweeping downwardly across the opening 42$^a$ by which the duct 36$^a$ is connected with the casing portion 10$^a$, assists in sweeping dust entering the casing through said opening, downwardly into the bottom of the casing for discharge through the lower, open end 35$^a$ thereof. At the same time, the lower strata of the incoming air or gas comprised by the lower, secondary current, is cleaned by the cyclonic flow of the air or gas in the lower part of the casing. Figures 8 to 11 additionally illustrate that the skimming opening 37$^a$ is disposed at the same side of the casing as the air or gas inlet conduit 28$^a$, so that air or gas entering the casing through said inlet conduit flows substantially entirely around the casing before it is skimmed of dust by the opening 37$^a$, obviously the Figure 1 construction may be modified in respect to the disposition of its skimming openings in accordance with the illustration of Figures 8 to 11.

Figure 12 of the drawings illustrates an embodiment of the invention which is essentially the same in construction and mode of operation as the embodiment of the invention illustrated in Figures 8 to 11, except that the inlet conduit 28$^b$ is of lesser height and the skimming opening 37$^b$ is elongated circumferentially of the casing, thereby to enable a greater amount of the upper, secondary air current to pass into the duct 36$^b$.

Figure 13 of the drawings illustrates an embodiment of the invention which is, in effect, a combination of the Figures 1 to 7 and the Figures 8 to 11 embodiments of the invention, in that the lower skimming opening is eliminated, as in the Figures 8 to 11 construction, and in that the duct 36$^c$ is connected with the lower, conical part of the casing, as in the Figures 1 to 7 construction, instead of with the top portion of the casing as in the Figures 8 to 11 construction. In accordance with the disposition of the opening 42c of the Figure 13 construction, the inlet conduit 28c and the lower end of the outlet pipe 32c are lowered as compared with the Figures 1 to 7 and the Figures 8 to 11 constructions.

The dust collecting efficiency of a cyclone is a function of the depth $l$ of the outlet-pipe 32 in the body of the cyclone (see Fig. 12). In the diagram of Fig. 16 the efficiency $n$ is plotted against the quotient $l/h$, where $l$=the depth of the outlet pipe and $h$=the height of the cylindrical part of the cyclone (see Fig. 12). Line A—B—C shows the efficiency of a usual type of cyclone without dust-circulating pipe 36. It will be seen that the efficiency is maximum when the outlet-pipe 32 is introduced very deeply so that $l$ is about as long as $h$ (point B in the diagram).

When the outlet-pipe is raised, the efficiency constantly decreases (B—A). It is an error to explain this by the lack of time for the dust particles to reach the periphery; it is entirely due to the unsuitable construction of the usual type of cyclone by ignoring the influence of the double-eddy current.

This is proven by the effect of the simple dust by-pass pipe 36, without any other alteration in this usual type of cyclone. If one provides the by-pass 36, the efficiency depends also upon the depth of the outlet-pipe $l$ into the cyclone body, as shown in the line D—E—F in the diagram, Fig. 17. Now the maximum is somewhat deeper than the half of the height of the cylindrical part, being just the place where the two halves of the double-eddy current border upon each other. This meeting point of the two halves of the double-eddy current will be found substantially to lie in the plane dividing the cyclone in two equal halves by volume. There is nothing altered in the path of the gases, so that the gain in efficiency I—K is due solely to the carrying away of the dust-ring, which, in the absence of the skimming opening 37, would form at the upper, outer corner of the cyclone.

As the line D—E—F is nearly symmetrical and D is nearly as low as F there is no evidence of the influence of a long path and a long time for the separation. The loading of the gases is minimum where the two halves of the eddy current border upon each other, and this is therefore the most suitable place for the outlet 40.

The provision of the dust by-pass 36 has been shown to have a further important influence on the behaviour of the cyclone. In the hitherto usual construction, increase in dust-loading of the gas increases the collection efficiency (see curve A—B—C, Fig. 17, where efficiency $n$ is plotted against the loading of the gases in grams per cubic meter). In a cyclone constructed according to the present invention the efficiency increases with reduction in dust-loading and is at its highest when the dust-loading is lowest with the dust by-pass in operation (see curve Diagram 17 of which portion D—E—F relates to the cyclone when fitted with by-pass).

A further feature of importance in design for securing high efficiency relates to the position of the inlet to the cyclone.

By lowering this so that it approximates as nearly as may be to the middle region of the cyclone the efficiency is increased, by reason of the fact that at this point the forces of the double-eddy current and centrifugal action are in cooperation as also that the introduction of the dust-laden gas at the region of dust concentration 29 is thereby avoided.

The advantages of the dust by-pass pipe 36 are: (1) higher efficiency, (2) less wear at the top of the cyclone, (3) the dust is discharged constantly and not intermittently.

Although only a single dust by-pass pipe 36 as shown gives a great gain in efficiency, two or more such pipes may be provided on each cyclone. Such external pipe or pipes 36 may also be replaced by a concentric plate 36d around and slidably spaced from the cyclone casing and provided at its top with a plurality of skimming openings 37d and at its bottom with an annular slot 42d in which is an annular series of vanes 13d.

The influence of the double-eddy current on functions and design of the upper part of the usual cyclone having been pointed out, important features in the lower part of the cyclone may now be set out according to the invention.

In Fig. 9 is shown what happens in the lower part of a cyclone. The current 49 carries the separated dust towards the bottom and dust-outlet 35, but in the centre the gases rise and form a windspout or vortex 39. By the currents 7 a part of the separated dust is brought to the foot of the vortex and this dust is sucked into the swirling central column of the spiral vortex 39 and conveyed to the top 40. The result is that a part of this dust is lost and escapes through the outlet-pipe 32.

This is a very important cause of inefficiency in the usual types of cyclones. The vortex 39 is also responsible for the fact that ordinary cyclones have a maximum efficiency at a certain moderate entrance-velocity of the gas, whilst increasing the velocity of entrance beyond this point decreases the efficiency.

The explanation is to be found in the fact that in the usual types of cyclone the dust forms not only rings at the top of the cyclone, but also in the lower conical part near the discharge 35. Here the centrifugal force tends to remove the dust from the centre, but the branch 49 of the double-eddy current tends to bring the dust to the discharge 35. Therefore at several points of the conical part 34 certain fractions of the dust are in equilibrium and turning round the axis, without being discharged. They may make hundreds of revolutions before accidentally reaching the discharge 35, and during all that time the finer dust particles are carried along with the current 49, brought to the foot of the vortex, and conveyed to the outlet 40.

It is not possible to avoid the vortex 39 but it is possible to avoid the formation of the dust-rings near the discharge 35 and to limit the dust-entraining action of the vortex.

Fig. 13 shows the manner in which this may be secured. The conical part of the cyclone must be elongated. This has a double effect. The upward component of the resolved centrifugal force is reduced whilst at the same time the inward tendency of the current 7c is correspondingly weakened so that dust will be less easily carried towards the rising column of the vortex. The cone 41c of Fig. 13 will give a higher efficiency to the cyclone than the cone 34b of Fig. 12.

The dust by-pass pipe 36c is extended to the lower region in the cone and reintroduces the dust at 42c. In Figure 13 is shown an improved type of cyclone with main inlet 28c near the midpoint between the two halves of the eddy current, and removed from the region immediately under the top cover of the cyclone with the outlet 40° at substantially the same level, and with a dust-circulating pipe 36° and elongated cone 41°.

For highest efficiencies the cone of the cyclone must be an extended one with a small angle or the lower portion of the cyclone must comprise conical rings of decreasing angle at L (Fig. 1) or alternate cones and cylinders.

The ideal profile for the cone is H—I—J—K—L in Fig. 1, but practically the same effect may be obtained by replacing this curve by composite cones and cylinders. The cylindrical part 43 in Fig. 1, or a similar cylinder lower down, is conveniently utilized to re-introduce the by-pass pipe 36 into the cyclone. However as previously stated this by-pass may with equal advantage deliver into a chamber below outlet 35.

The slot 44 (Fig. 1) is not always necessary. In general there will be provided dust-evacuation or skimming devices along the pipe 36 at places in the cyclone where the dust tends to form rings. Just as the dust ring at the top of the cyclone is taken away by the skimming place 37, so at any other place where the dust tends to assemble it may be evacuated by a slot. In this manner also the cyclone is immediately clean when no further dust is introduced, whereas the usual type of cyclone does not clean itself.

The cyclone shown in Figs. 1 and 13 has its maximum of efficiency not at low but at higher velocities. However even at low velocity the efficiency is much higher than of the type shown in Fig. 12.

The essential characteristics of a cyclone, according to the invention, are: gas inlet and outlet substantially at the junction of the two halves of the double-eddy current, an external dust by-pass pipe 36 and an elongated cone 45, or cones in combination with a cylinder 43.

What I claim is:—

1. Apparatus for removing dust and other foreign matter from a gas comprising a vertically disposed casing the upper portion of which has a curved, substantially vertically disposed side wall, a wall closing the top of said casing, said casing having a gas inlet opening, a gas supply conduit disposed to discharge tangentially into said casing through said inlet opening, a gas outlet pipe extending through the top wall of said casing downwardly into said casing and having its lower end open and disposed between the planes of the upper and the lower ends of said inlet opening, the side wall of the casing having a tangentially disposed skimming opening extending upwardly to the top wall of said casing, and a dust discharge duct leading from said skimming opening.

2. Apparatus as set forth in claim 1, in which the dust discharge duct has a dust outlet in the wall of the casing, said outlet being situated below the open lower end of the gas outlet pipe.

3. Apparatus as set forth in claim 1, in which the casing has a second tangentially disposed skimming opening located at a level below the open lower end of the gas outlet pipe and communicating with the dust discharge duct.

4. Apparatus as set forth in claim 1, in which the wall of the casing has a plurality of tangentially disposed skimming openings extending upwardly to the top wall of said casing, and circumferentially spaced apart, and in which a jacket is disposed around and spaced from the top portion of the casing to provide the dust discharge duct.

5. Apparatus as set forth in claim 1, in which the lower, substantially conical portion of the casing comprises an upper and a lower substantially conical section interconnected by a substantially cylindrical section, and in which the duct leading from the skimming opening downward discharges through an opening in the wall of said substantially cylindrical section.

6. Apparatus as set forth in claim 1, in which the lower, substantially conical portion of the casing comprises upper and lower substantially conical sections and a substantially cylindrical section connecting the same, in which the dust discharge duct leads downwardly from the skimming opening and is in communication with the casing through an opening in said substantially cylindrical section, and in which the casing has an additional tangentially disposed skimming opening located at a level below the open lower end of the gas outlet pipe and communicating with said dust discharge duct.

7. Apparatus for removing dust and other foreign matter from a gas comprising a vertically disposed casing the upper portion of which has a curved substantially vertically disposed side wall, a wall closing the top of said casing, the lower portion of said casing being of substantially conical form, a gas inlet conduit communicating tangentially with said casing, a gas outlet pipe extending through the top wall of said casing downwardly into said casing and having an open lower end disposed between the planes of the upper and the lower ends of the inlet conduit, the side wall of the casing having a tangentially disposed skimming opening extending upwardly to the top wall of said casing, the lower, conical portion of said casing having a tangentially disposed skimming opening, and a duct leading from said first mentioned skimming opening to said second mentioned skimming opening.

8. Apparatus as set forth in claim 7 in which the lower, substantially conical portion of the casing comprises upper and lower substantially conical sections and a substantially cylindrical section interconnecting the same, and in which the duct leads downwardly from the skimming openings and is in communication with the casing through an opening in said substantially cylindrical section.

9. Apparatus as set forth in claim 7 in which the skimming openings are disposed, one above and the other below the horizontal medial plane of the air or gas inlet opening.

10. Apparatus as set forth in claim 7 in which the top of the air or gas inlet conduit is disposed below the top of the casing and above the lower open end of the air or gas outlet pipe.

HERMANNUS van TONGEREN.